F. R. PENCE.
BOLSTER FOR VEHICLES.
APPLICATION FILED JULY 6, 1914.
1,225,168.
Patented May 8, 1917.
2 SHEETS—SHEET 1.
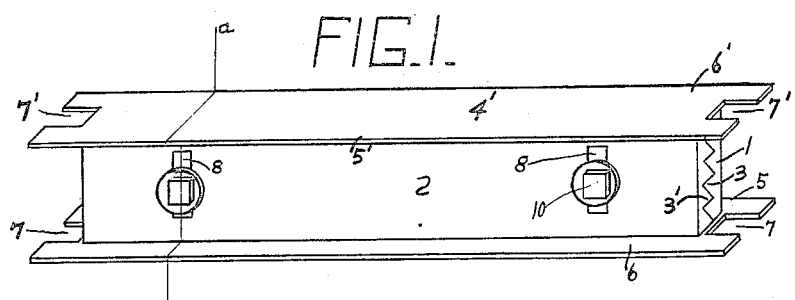
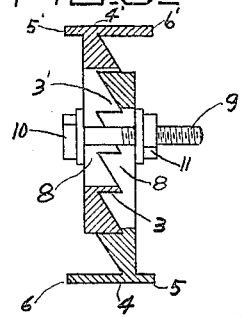
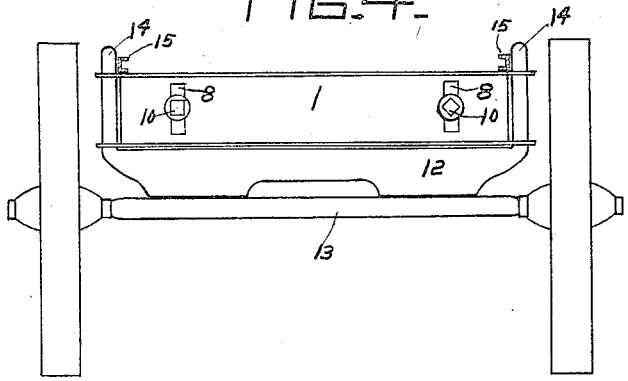
WITNESSES:
INVENTOR
Frank R. Pence
BY
Chester F. Braselton
ATTORNEY

F. R. PENCE.
BOLSTER FOR VEHICLES.
APPLICATION FILED JULY 6, 1914.

1,225,168.

Patented May 8, 1917.
2 SHEETS—SHEET 2.

WITNESSES:
T. Clay Lindsey
Ida M. Offerman

INVENTOR
Frank R. Pence
BY
Chester N. Braselton
ATTORNEY

UNITED STATES PATENT OFFICE.

FRANK R. PENCE, OF PENCE, INDIANA.

BOLSTER FOR VEHICLES.

1,225,168.  Specification of Letters Patent.  Patented May 8, 1917.

Application filed July 6, 1914. Serial No. 849,194.

*To all whom it may concern:*

Be it known that I, FRANK R. PENCE, a citizen of the United States, residing at Pence, in the county of Warren and State of Indiana, have invented certain new and useful Improvements in Bolsters for Vehicles, of which I declare the following to be a full, clear, and exact description.

This invention relates to false bolsters for vehicles to be used with the running gear of vehicles such as trucks, wagons or the like, and to be located above the usual permanent bolsters of such vehicles, to support removable superstructure such as beds, racks or the like, and is particularly adapted for use in connection with trucks or wagons when used for carrying racks, such as hay racks, stock racks and other racks used in connection with wagons or trucks and which are removably mounted on them.

An object of this invention is to provide an intermediate supporting means to be mounted on the permanent bolsters of vehicles and upon which removable racks or other removable superstructures are adapted to rest. Such intermediate supporting means, which I shall term a false bolster, I make adjustable in height, so that by its adjustment the corresponding end of the removable rack or superstructure may be supported and carried at various heights above the surface of the corresponding permanent bolster of the vehicle. These false bolsters may be used at either the front end of the vehicle or the rear, or both, and by their vertical adjustability the rack or other superstructure may readily be made to assume a horizontal position, or such inclination to a horizontal as is desired. By their use racks or other removable superstructures may be conveniently supported at such heights above the permanent bolsters of vehicles, as to eliminate as much lifting as is desired, which would be otherwise required, in order to elevate the removable rack or superstructure, when taking it from the vehicle, sufficiently, so that the bottom of the rack or superstructure will clear the usual upwardly projecting standards of the permanent bolsters, or the tops of the vehicle wheels when the rack or superstructure is moved laterally of the vehicle in removement therefrom.

By the use of my novel false bolster I am also able to eliminate relatively long depending legs, which have sometimes been used as a fixed part of removable racks whereby the latter may be supported from the permanent bolsters of vehicles, so that the main portion of the racks are carried at substantial distances above the tops of the permanent bolsters. In removing such racks carried from the bolsters by downwardly projecting legs, they have necessarily had to be elevated substantially when being removed from the vehicle, in order to remove the rack sidewise from their position on the vehicle bolsters. By dispensing with such legs as a fixed part of the racks, or by substantially shortening them, and by interposing my false bolster, which is conveniently removable from position and which is not a fixed part of the rack or superstructure or of the permanent bolster, the rack or superstructure may be carried by the false bolster at such heights above the permanent bolsters as will require but little elevation of the rack or superstructure when moving it from position on the vehicle, sidewise to the ground.

With these and other incidental objects in view the invention further consists in certain novel details of construction, combinations and arrangements of parts, all as will be now described and poitned out particularly in the appended claims.

Referring to the accompanying drawings which form a part of this specification;—

Figure 1 is a perspective view of one form of my novel false bolster.

Fig. 2 is a perspective view of one of the adjustable elements of my bolster.

Fig. 3 is a cross section on the line $a$—$a$ Fig. 1.

Fig. 4 is a rear elevation of a wagon showing my adjustable bolster in place, and in section the longitudinal sills of a removable rack when in place on the false bolster applied to the rear permanent bolster of a wagon.

Figure 5:
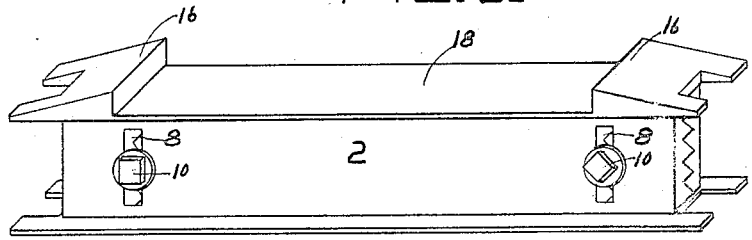
Fig. 5 is a perspective view similar to Fig. 1 but of slightly different configuration on top, making it more suitable for use in connection with the front end of racks in which the longitudinal sills which rest on a false bolster are closer together at the front end than the width of the bolster.

Referring to Fig. 1, my novel false bolster will be seen to be comprised of two main portions 1 and 2 which may be of any desirable material but preferably of metal such as steel or iron. The portion 1 is comprised of a vertical portion having on one side serrations or teeth 3 and a horizontal portion or base 4 which extends at its ends slightly beyond the vertical portion and also extends slightly from the vertical portion at one side as at 5 and somewhat farther from the vertical portion at the other side as at 6. At the ends of the base 4 of the portion 1 are notches 7 preferably extending back substantially to the plane of the ends of the body portion of the bolster. The vertical portion of the member 1 is provided intermediate its ends with two vertical slots 8, Fig. 2, and preferably as shown in Fig. 2, the serrations or teeth 3 of the member 1 extend from end to end of the bolster, so that the vertical slots 8 are cut through these teeth or serrations on one side.

The other member 2 of the false bolster is similar to the one just described having the same extensions 4', 5' and 6', the end notches 7' and vertical slots 8. When the bolster is assembled this member 2 is however inverted so that its vertical portion is beneath the horizontal portion, which latter thus forms the top for the bolster, the two elements of which are held together with their teeth 3, 3' in coöperation, by bolts 9 passing through the alining slots 8 of the two elements, and provided with heads 10 at one end and clamping nuts 11 working on their opposite threaded ends. The end notches 7, 7' at each end aline for the purpose of receiving vertical standards which are usually carried by and project above fixed bolsters of wagons, which standards by engagement in these notches serve to hold the false bolster from lateral movement off of the vehicle permanent bolsters. As shown, washers are used between the heads 10 and clamping nuts 11 of the bolts 9 and the adjacent faces of the false bolster.

From this description of the form shown in perspective in Fig. 1, it will be apparent that the upper and lower bases 4' and 4 respectively, may readily be adjusted to various distances apart by merely loosening the clamping nuts 11 of the bolts 9 and moving these bases, with their corresponding vertical portions, toward or from each other, and then by clamping them in their adjusted position by tightening the clamping nuts 11 on the bolts 9. The height of the vertical portions of these two members may be varied as well as the number of serrations on their coöperating faces, and when the two members are firmly held together with adjacent teeth in coöperation and interlocking, it will be seen that the bolster will present a very substantial and firm false bolster of a height depending upon the adjustment made between the two members 1 and 2. The teeth or serrations 3 may or may not extend the whole length of the bolster just as is desired, and in fact it is not necessary that the elements 1 and 2 of the bolster be solid throughout as they may have recesses such as shown at 22, Fig. 8, so as to lighten them.

As will appear from the drawings the teeth or serrations 3 and 3' are preferably provided with one of their surfaces substantially at right angles to the height of the bolster so that when the two elements of the latter are assembled the upper one of these will rest squarely upon the horizontal surface of the teeth of the lower element so that application of pressure to the uppermost of the members 1 or 2 will not tend to wedge these members apart against the action of the bolts 9 as would be the case if the teeth were more of a V shaped formation. The length of the slots 8 and the number of teeth 3 on the members 1 and 2 are to be made sufficient to afford all the desired vertical adjustment of the members 1 and 2 relatively to each other.

In Fig. 4 the false bolster of Figs. 1, 2 and 3 is shown applied to the rear permanent bolster of a wagon. In this view 1 is the adjustable false bolster and 12 is the permanent rear bolster of the wagon supported from the rear axle 13. 14 are the vertical standards projecting upwardly from the end of the wagon bolster 12. The false bolster is shown in place on the wagon bolster 12 with the standards 14 of the latter projecting upwardly through the notches 7, 7' of the false bolster thus to keep the latter in place on the bolster 12. It is however readily removable and replaceable thereon. 15 are the longitudinal sills of a removable rack showing their location just inside the standards 14 and resting on top of the false bolster 1. For brevity the remainder of the rack is not shown.

Figure 6:
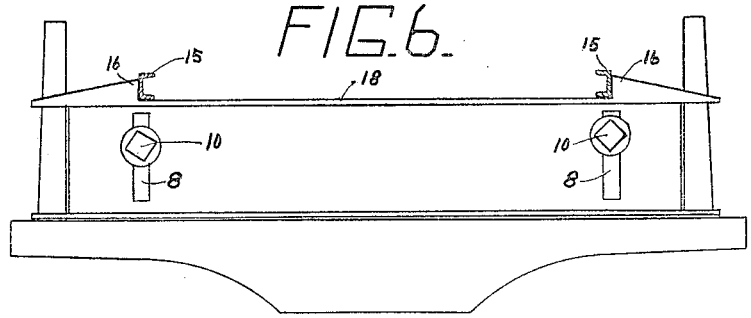
Fig. 6 is a front elevation of the bolster of Fig. 5 showing it in place on the front permanent bolster of a wagon, and showing in cross section, the longitudinal sills of the rack in position on the false bolster.
Figure 7:
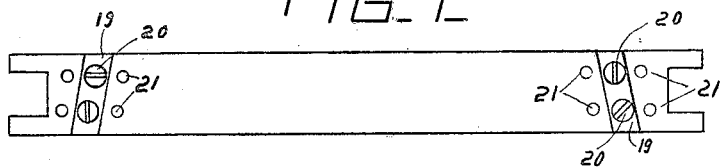
Fig. 7 is a top view of a slightly different form of bolster for use at the front end of the rack and on which top integral projections of Fig. 5 are replaced by adjustable cleats.
Figure 8:
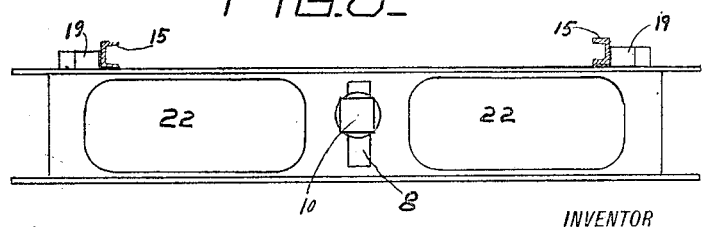
Fig. 8 is a front elevation of the bolster of Fig. 7 showing the longitudinal sills of the rack in place thereon in section. In this form the adjustable elements are held together by single clamping means instead of the two as shown in the other forms.

The form of false bolster heretofore described is adapted for use either with the front or rear permanent bolsters of a vehicle. However, it is often the case in racks or superstructure of a vehicle that the part which engages the front bolster of a vehicle is of less width than the inside of the front bolster, and for this reason in some cases outwardly extending projections have been provided to fill the remainder of the space between the standards of the front bolster. The frame of the rack or superstructure is frequently narrowed near the front to facilitate turning of the vehicle within a smaller area. To provide for this narrowed framework at the front end of racks or superstructures, the forms shown in Figs. 5, 7 and 8 are provided. Of these, forms as shown in Figs. 5 and 6, are identical with the form of Figs. 1–4 with the exception that instead of both of the bases being level throughout, these Figs. 5 and 6 show projections 16 on the top horizontal portion of the member 2, one of these projections being at each end and forming opposed abutments between which the restricted frame-work of the front portion of the rack is to be located resting upon the flat portion 18 of the false bolster. The restricted in width, front end of the frame-work of the rack or superstructure is adapted to substantially fill the space between the abutments as shown in Fig. 6, so that these abutments will prevent all lateral movement of the rack or superstructure relative to the bolster even though the rack at this point does not fill this space between the vertical standards of the front permanent bolster of a vehicle.

In Figs. 7 and 8 cleats 19 are attached to the top of an otherwise flat-topped bolster such as shown in Figs. 1–4. These are fastened to the top of the false bolster by means of screws 20 or in any other convenient manner and a plurality of sets of holes 21 are provided in the top surface of the adjustable false bolster so that the cleats may be located closer together or farther apart as desired to fit racks or superstructures whose bases differ in width. In fact these cleats and screws may be completely removed from the top of the false bolster thus leaving it in effect the same as the form shown in Figs. 1–4. Figs. 7 and 8 show these cleats 19 slightly converging toward the front of the rack or superstructure to better fit converging longitudinal sills of the superstructure or rack frame-work which sills are to rest on the false bolster and support the rack or superstructure therefrom. Of course various ways will occur for fastening the cleats 19 detachably to the top of the false bolster and any well known and desirable way may be used. In Figs. 5 and 6 the projections 16 are shown integral with the element 2 of the false bolster but even these in the form shown might be removably attached. Fig. 8 shows but one fastening bolt 9 and one pair of slots 8, one in each of the members 1 and 2, and these slots and bolts I have shown near the middle of the bolster. In this view I have shown the elements 1 and 2 recessed at 22 between the slots 8 and the end of the bolster which construction serves to make the false bolster lighter and more convenient for handling. The teeth 3 may or may not as desired extend throughout the unrecessed portions of the members 1 and 2 of the bolster as shown and the single fastening idea of this figure is of course adapted as well to supplant the two clamping bolts of the form shown in the other figures. In this Fig. 8 the longitudinal sills of the rack are shown in sections and this figure in connection with Fig. 7 show an exaggerated convergence of the cleats 19 to better make their convergence clear. They may or may not converge, however, as a perfectly practical form results without.

All the forms above described are adjustable in height by similar operations, yet as different ways of getting this adjustment may readily occur to those skilled in the art I do not wish to limit myself to any details of the construction shown except as is required by the scope of the appended claims. The false bolster as shown is designed as a separate unit detached from both the rack and superstructure and the vehicle bolster proper and is intended to be attached to the latter just as desired and with the adjustment required to hold the rack or superstructure the desired height above the permanent bolsters. Where desired it might, however, be permanently located on the vehicle bolster or under frame of the rack or superstructure. I prefer, however, to use the false bolster as a separate part and freely removable from either and usable or not with them as desired.

The operation and manner of using the herein disclosed false bolster is believed apparent from the above description. It may be made of any material desired though I preferably make it of metal or wood, and it may be made in any size found desirable.

Having thus described my invention what I claim and desire to secure by Letters Patent is:

1. An adjustable false bolster for vehicles comprising complementary sections, each having a horizontal portion and a vertical portion, the contiguous faces of said vertical portions being provided with horizontal ledges connected by inclined portions, said vertical portions being provided with alined openings; and bolts passing through said openings and holding said complementary sections together with said horizontal ledges in engagement with each other, substantially as described.

2. An adjustable, two-part, false bolster for vehicles comprising complementary sections, each having a horizontal portion and a vertical portion, the contiguous faces of said vertical portions being provided with horizontal ledges; and bolts passing through said vertical portions and holding said sections together with adjacent horizontal ledges in engagement.

3. An adjustable, two-part false bolster comprising complementary sections, each section having a horizontal portion and a vertical portion, the contiguous faces of said vertical portions being provided with serrations; and bolts passing through said vertical portions and clamping said sections together with the serrated faces engaging each other.

4. An adjustable, two-part false bolster comprising complementary sections, each section having a horizontal portion and a vertical portion, said vertical portions being adjustable on each other; and means for clamping said sections together.

5. An adjustable, two-part false bolster comprising complementary sections, each section having a horizontal portion and a vertical portion, said horizontal portions being provided with notches in the ends thereof; and means for clamping said sections together.

In testimony whereof I affix my signature in the presence of two witnesses.

FRANK R. PENCE.

Witnesses:
E. A. WOOD,
ORIN W. FISHER.

Copies of this patent may be obtained for five cents each, by addressing the "Commissioner of Patents, Washington, D. C."